United States Patent
Furuya et al.

(10) Patent No.: US 8,786,250 B2
(45) Date of Patent: Jul. 22, 2014

(54) IC CARD

(75) Inventors: Tatsuya Furuya, Kanagawa (JP);
Katsunori Takahara, Kanagawa (JP);
Hiroyuki Morioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 569 days.

(21) Appl. No.: 12/933,445

(22) PCT Filed: Dec. 24, 2008

(86) PCT No.: PCT/JP2008/073469
§ 371 (c)(1),
(2), (4) Date: Sep. 27, 2010

(87) PCT Pub. No.: WO2009/116218
PCT Pub. Date: Sep. 24, 2009

(65) Prior Publication Data
US 2011/0018490 A1    Jan. 27, 2011

(30) Foreign Application Priority Data

Mar. 21, 2008 (JP) ................. P2008-073013

(51) Int. Cl.
*H02J 7/00* (2006.01)
(52) U.S. Cl.
USPC ........................ 320/107; 320/112; 320/132
(58) Field of Classification Search
CPC ...................................... H02J 7/025
USPC ........................ 320/101, 108, 107
See application file for complete search history.

(56) References Cited

U.S. PATENT DOCUMENTS

| 4,917,973 | A | * | 4/1990 | Yoshimoto et al. ........... 429/91 |
| 5,737,114 | A | * | 4/1998 | Bailey ........................... 359/268 |
| 6,608,464 | B1 | * | 8/2003 | Lew et al. ..................... 320/107 |
| 7,164,384 | B2 | * | 1/2007 | Howard .................... 342/357.31 |
| 7,504,804 | B2 | * | 3/2009 | Johnson et al. ............... 320/150 |
| 7,710,270 | B2 | | 5/2010 | Shionoiri et al. |
| 2004/0084661 | A1 | * | 5/2004 | Zhang et al. ................. 252/586 |
| 2006/0227523 | A1 | * | 10/2006 | Pennaz et al. ................ 361/783 |
| 2007/0103311 | A1 | * | 5/2007 | Kippelen et al. ........... 340/572.8 |
| 2008/0001577 | A1 | * | 1/2008 | Sather ........................... 320/162 |
| 2011/0221272 | A1 | * | 9/2011 | Koyama et al. ................ 307/42 |

FOREIGN PATENT DOCUMENTS

| JP | 62-012064 | 1/1987 |
| JP | 03-033910 | 2/1991 |
| JP | 2003-273386 | 9/2003 |

(Continued)

OTHER PUBLICATIONS

Japanese Patent Office, Notification of reasons for refusal issued in connection with Japanese Patent Application No. 2008-073013, dated Aug. 21, 2012. (4 pages).

*Primary Examiner* — Edward Tso
*Assistant Examiner* — Ahmed Omar
(74) *Attorney, Agent, or Firm* — K&L Gates LLP

(57) ABSTRACT

An IC card having a secondary battery, which causes no increase in thickness and also has excellent safety, is provided. The IC card includes an antenna coil for inducing electric power by electromagnetic induction, a thin-film battery for storing electric power induced by the antenna coil, and a control portion for controlling the storage of the electric power from the antenna coil in the thin-film battery. The thin-film battery includes a positive electrode, a negative electrode, and a solid electrolyte layer between the positive electrode and the negative electrode.

12 Claims, 8 Drawing Sheets

(56) References Cited

FOREIGN PATENT DOCUMENTS

| | | |
|---|---|---|
| JP | 2005-78370 | 3/2005 |
| JP | 2007-227362 | 9/2007 |
| JP | 2007-280372 | 10/2007 |
| JP | 2008-009972 | 1/2008 |
| JP | 2008-038252 | 2/2008 |

* cited by examiner

IC CARD

CROSS REFERENCE TO RELATED APPLICATIONS

The present application is a national stage of International Application No. PCT/JP2008/073469 filed on Dec. 24, 2008 and claims priority to Japanese Patent Application No. 2008-073013 filed on Mar. 21, 2008, the disclosures of which are incorporated herein by reference.

BACKGROUND

The present invention relates to an IC card. More specifically, it relates to an IC card having a power supply.

Non-contact IC cards have been widely used in recent years, which have an integrated circuit (IC) capable of electronically storing information and a coiled antenna connected to the integrated circuit and capable of transmitting and receiving electromagnetic waves. In such a non-contact IC card, the antenna receives electromagnetic waves from a reader/writer, and the integrated circuit is driven using electric power generated through electromagnetic induction, thereby making communication with the reader/writer.

Incidentally, in recent years, there is a demand for such an IC card to allow the user to view and check the information stored in the IC card, such as the balance or points, anytime and anywhere he/she wants. In order to meet such a demand, JP-A-2007-280372 has proposed a technique in which a liquid-type secondary battery is mounted on an IC card, and the secondary battery drives a display device to display information. Further, JP-A-2003-273386 has proposed a technique in which a solar cell is mounted on an IC card so that the solar cell drives a display device.

However, according to the technique disclosed in JP-A-2007-280372, because a liquid-type electrolyte is used as the electrolyte of the secondary battery, the IC card has an increased thickness, impairing the advantages of the IC card being thin and flexible. In addition, there will be a liquid leakage incase of breakage, and this possibly short-circuits the electrical circuit or the battery. Mounting a liquid-type secondary battery on an IC card thus also has safety problems.

According to the technique disclosed in JP-A-2003-273386, it is difficult to display information, such as the balance, on the display device in an environment where sufficient light cannot be provided. Therefore, in order to improve the convenience of an IC card, it is desired to mount a secondary battery on the IC card.

Therefore, an object of the invention is to provide an IC card having a secondary battery, which causes no increase in thickness and also has excellent safety.

SUMMARY

In order to solve the problems mentioned above, a first invention is an IC card including:
an antenna coil for inducing electric power by electromagnetic induction;
a thin-film battery for storing electric power induced by the antenna coil; and
a control portion for controlling the storage of the electric power from the antenna coil in the thin-film battery.

A second invention is an IC card including:
a solar cell;
a thin-film battery for storing electric power generated by the solar cell; and
a control portion for controlling the storage of the electric power from the solar cell in the thin-film battery.

According to the first invention, when the IC card is brought close to a reader/writer, the electromagnetic field of the reader/writer produces an electromotive force in the antenna coil in the IC card, whereby a current flows therethrough. When a current flows through the antenna coil in this way, the control portion controls the charging of the thin-film battery from the antenna coil, and an electric charge is stored in the thin-film battery. Using the thus-charged thin-film battery as a power supply, the control portion drives a display portion, etc.

According to the second invention, when the solar cell is exposed to light, the solar cell converts the light into electric power. When the solar cell generates electricity in this way, the control portion controls the charging of the thin-film battery from the solar cell, and an electric charge is stored in the thin-film battery. Using the thus-charged thin-film battery as a power supply, the control portion drives a display portion, etc.

Further, in the first and the second inventions, because the thin-film battery is thin and also has excellent flexibility, the thickness of the IC card is not increased, and the flexibility thereof is not impaired. In addition, because the thin-film battery does not use a liquid-type electrolyte, no liquid leakage occurs in case of breakage.

These inventions allow the provision of an IC card having a secondary battery, which causes no increase in thickness and also has excellent safety.

Additional features and advantages of the present invention are described in, and will be apparent from, the following Detailed Description and the Figures.

DETAILED DESCRIPTION

Figure 1:
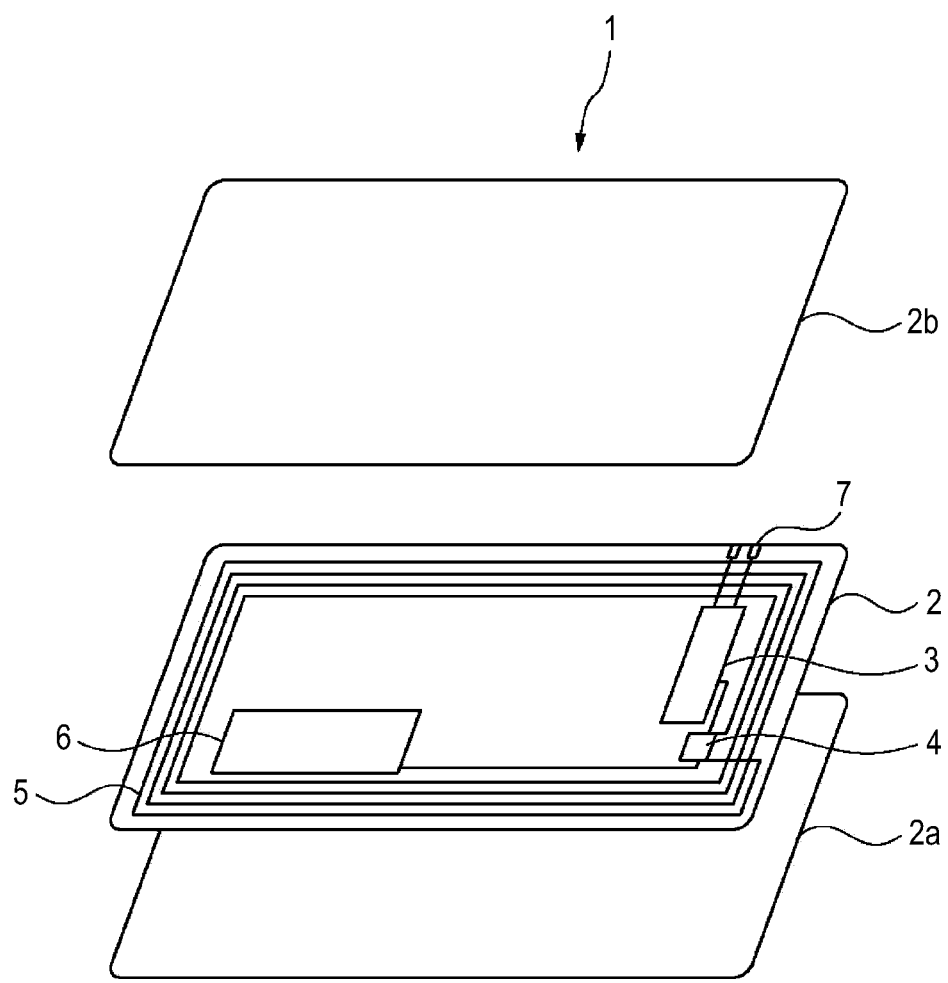
FIG. 1 is an exploded perspective view showing an example of the configuration of an IC card according to a first embodiment of the invention.

Hereinafter, some embodiments of the invention will be described with reference to the drawings. Like reference numerals represent identical or corresponding parts throughout all the figures in the following embodiments.

(1) First Embodiment

FIG. 1 is an exploded perspective view showing an example of the configuration of an IC card according to the first embodiment of the invention. This IC card 1 is a so-called non-contact IC card, and includes a substrate 2 and a facing 2a and a facing 2b disposed on the opposite surfaces of the substrate 2, as shown in FIG. 1. On the substrate 2, a thin-film battery 3, an antenna coil 5, a display portion 6, an IC chip 4, and an external connection terminal 7 are provided. The opposite ends of the antenna coil 5 are connected to the IC chip 4. The display portion 6 and the thin-film battery 3 are connected to the IC chip. The thin-film battery 3 is connected to the external connection terminal 7, and an external power supply is connectable to the external connection terminal 7.

The substrate 2 may be in the form of a film, a sheet, or a board. However, the material is not limited thereto, and any material selected according to the intended properties of the IC card 1 is usable. In terms of durability, convenience, etc., the material of the substrate 2 is preferably a flexible resin material. Examples of usable resin materials include PEN (polyethylene naphthalate), PET (polyethylene terephthalate), polyimide (PI), and polyester. However, the material is not limited thereto, and any known resin material selected according to the intended properties of the IC card 1 is usable.

The facings 2a and 2b form the front surface and the back surface of the IC card 1, and are made of a polymer material such as PET (polyethylene terephthalate), PBT (polybutyl terephthalate), PEG (polyethylene glycol), or oriented PET as a main component. However, the material is not limited thereto, and any known resin material selected according to the intended properties of the IC card 1 is usable.

The antenna coil 5 is an electromagnetic induction coil in the shape of a loop coil wound multiple times on the substrate 2. The opposite ends of the antenna coil 5 are connected to the IC chip 4. The antenna coil 5 receives an alternating current magnetic field from a reader/writer, thus induces an alternating voltage, and supplies the alternating voltage to the IC chip 4. The antenna coil 5 can be formed, for example, using a winding technique, an embedded winding technique, an etching process, a plating process, a screen-printing process, or the like.

The display portion 6 preferably has flexibility, and may be a liquid crystal display, an organic electroluminescence display (OEL), or the like, for example. The display portion 6 is driven by electric power supplied from the thin-film battery 3, whereby information or the like stored in the IC chip 4 is displayed thereon. The IC card 1 may be configured to further include a button for controlling the driving of the display portion 6, so that the user can press the button to drive the display portion, allowing the information to be displayed on the display portion.

The IC chip 4 is driven by electric power supplied from the thin-film battery 3 or the antenna coil 5 and thereby controls parts of the IC card 1. For example, the IC chip 4 communicates with a reader/writer through the antenna coil 5. Specifically, the IC chip 4 performs mutual authentication or date exchange with a reader/writer. The IC chip 4 also controls the charging of a secondary battery from an external power supply connected to the external connection terminal 7 or controls the charging of the thin-film battery 3 from the antenna coil 5.

The thin-film battery 3 is a thin-film secondary battery capable of repeated charging/discharging, and stores an electric charge supplied from an external power supply connected to the external connection terminal 7 or from the antenna coil 5. The thin-film battery 3 also supplies electric power to a CPU 14 and/or the display portion 6.

Figure 2:
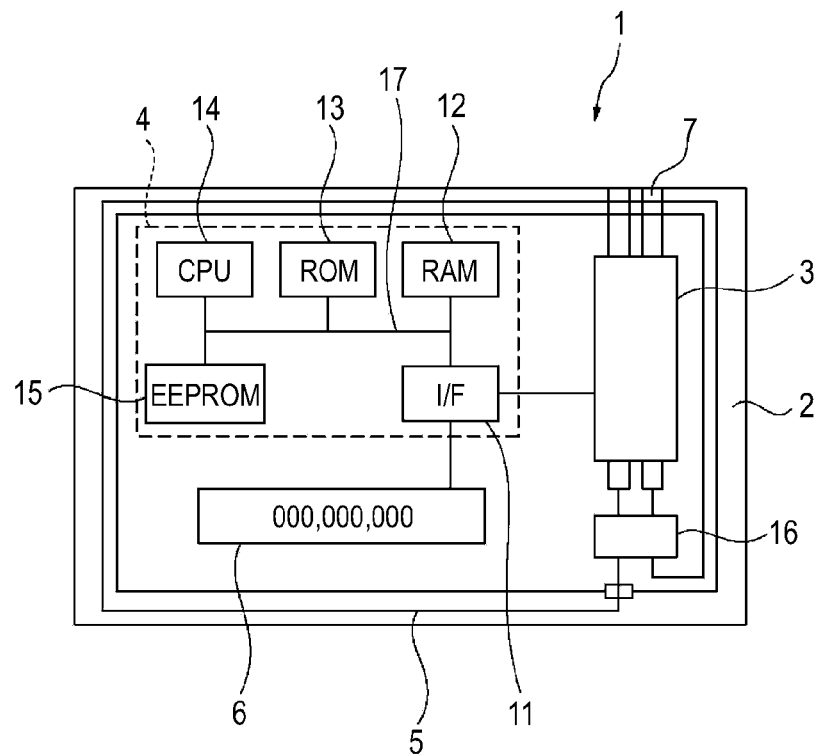
FIG. 2 is a block diagram showing an example of the configuration of the IC card according to the first embodiment of the invention.

FIG. 2 is a block diagram showing an example of the circuit in the IC card according to the first embodiment of the invention.

The IC chip 4 includes an interface 11, a RAM (Random Access Memory) 12, a ROM (Read Only Memory) 13, the CPU (Central Processing Unit) 14, an EEPROM (Electrically Erasable and Programmable ROM) 15, and a voltage converter 16. The interface 11, the RAM 12, the ROM 13, the CPU 14, and the EEPROM 15 are connected to a bus 17. The thin-film battery 3 and the display portion 6 are connected to the bus 17 through the interface 11.

The RAM 12 is used as a work memory of the CPU 14. The EEPROM 15 stores information such as the balance of electronic money loaded onto the IC card 1 or the history thereof. The voltage converter 16 converts the alternating voltage supplied from the antenna coil 5 into a direct voltage. The direct voltage converted by the voltage converter 16 is supplied to the thin-film battery 3.

The CPU 14 operates in accordance with an operation program pre-stored in the ROM 13, and controls communication with a reader/writer, for example. The CPU 14 operates in accordance with the operation program pre-stored in the ROM 13, and allows the display portion 6 to display information. The CPU 14 operates in accordance with the operation program pre-stored in the ROM 13, and controls the charging and discharging of the thin-film battery 3 through the interface 11. For example, when an external power supply is connected to the external connection terminal 7, the CPU 14 controls the charging of the thin-film battery 3 from the external power supply. When an alternating current is induced by the antenna coil 5, the CPU 14 controls the charging of the thin-film battery 3 from the antenna coil 5.

Figure 3:
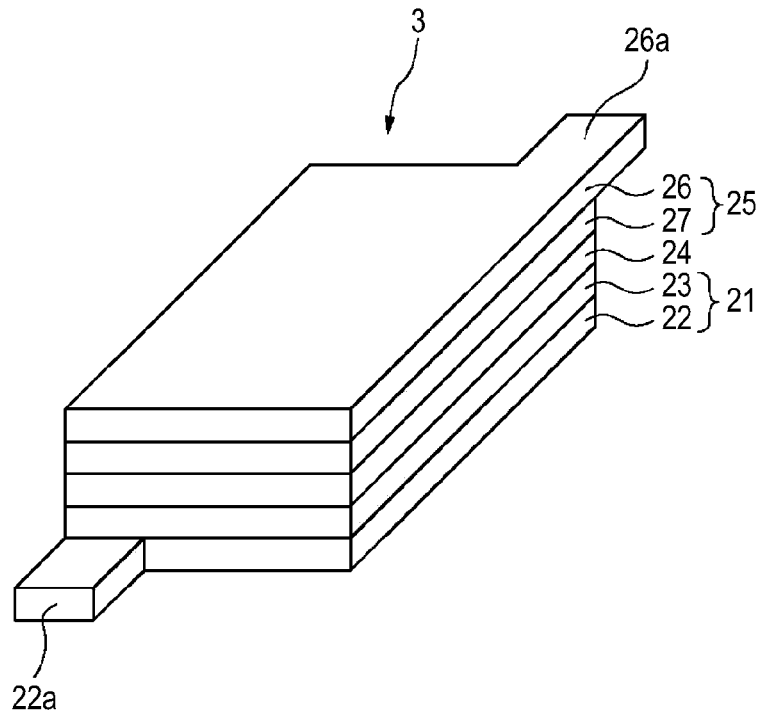
FIG. 3 is a perspective views showing an example of the configuration of a thin-film battery in the IC card according to the first embodiment of the invention.

FIG. 3 shows an example of the configuration of the thin-film battery 3 according to the first embodiment of the invention. The thin-film battery 3 is an all-solid thin-film secondary battery, and has a positive electrode 21, a negative electrode 25, and a solid electrolyte layer 24 disposed between the positive electrode 21 and the negative electrode 25, as shown in FIG. 3.

The positive electrode 21 includes a positive current collector 22 and a positive electrode active material layer 23 disposed on one principal surface of the positive current collector 22. In addition, the positive electrode 21 has a positive terminal 22a at an end thereof. The positive terminal 22a is made of, as a main component, the same metal material as used for the positive current collector 22, for example. The positive terminal 22a may be formed integral with the positive current collector 22, or may alternatively be connected to an end portion of the positive current collector 22.

The positive current collector 22 is preferably made of a material with excellent chemical stability and electrical conductivity as a main component. Examples of such materials are aluminum, nickel, stainless steel, copper, platinum, gold, silver, and like metal materials, oxides of indium and tin (Indium Tin Oxide, hereinafter referred to as ITO), etc. The positive current collector 22 may be made of any material as long as it has electron conductivity and does not react with the positive electrode active material layer 23, and examples thereof are not limited to the above-mentioned materials.

The positive electrode active material layer 23 is made of, as a main component, a positive electrode active material capable of occluding and releasing lithium. Examples of usable positive electrode active materials capable of occluding and releasing lithium include a composite oxide of lithium and a transition metal, which is based on the chemical formula $Li_xMO_2$ wherein M represents a single kind or a compound of two or more kinds of transition metals, and x varies depending on the state of charge/discharge of the battery and is usually 0.05 or more and 1.10 or less. Examples of transition metals usable for forming such a lithium composite oxide include cobalt (Co), nickel (Ni), and manganese (Mn).

Specific examples of such lithium composite oxides include lithium composite oxides with a layered structure, such as $LiCoO_2$, $LiNiO_2$, and $Li_xNi_yCO_{1-y}O_2$ (x and y vary depending on the state of charge/discharge of the battery, and usually $0<x<1$ and $0.7<y<1.02$), and spinel-type lithium-manganese composite oxides represented by $LiMn_2O_4$ and the like. It is also possible to use a solid solution obtained by substituting some of the transition metal elements with different elements. These lithium composite oxides can produce high voltages and have excellent energy density. It is also possible to use as the lithium composite oxide a metal oxide with an olivine-type structure represented by the general formula $LiMPO_4$, for example, wherein M is at least one kind selected from Fe, Mn, Co, and Ni. Specific examples thereof include $LiFePO_4$, $LiMnPO_4$, $LiCoPO_4$, and $LiNiPO_4$.

In the case where a lithium composite oxide with a layered structure is used as the positive electrode active material, it is preferable that the lithium composite oxide is oriented so that the layers forming the lithium composite oxide are perpendicular to the principal surfaces of the solid electrolyte layer 24. This is because lithium released from the negative electrode 25 is intercalated between layers of the lithium composite oxide at the time of discharge of the thin-film battery 3, and thus the above orientation facilitates the movement of lithium, reducing the resistance of the positive electrode active material layer 23.

It is also possible to use as the positive electrode active material a lithium-free metal sulfide or metal oxide, such as $TiS_2$, $MoS_2$, $NbSe_2$, or $V_2O_5$, a specific polymer such as polyaniline or polythiophene, or the like. The material of the positive electrode active material layer 23 may also be a single kind or a mixture of two or more kinds of the above-mentioned lithium composite oxides, metal sulfides, metal oxides, and the like.

The negative electrode 25 includes a negative current collector 26 and a negative electrode active material layer 27 disposed on one principal surface of the negative current collector 26. In addition, the negative electrode 25 has a negative terminal 26a at an end thereof. The negative terminal 26a is made of, as a main component, the same metal material as used for the negative current collector 26, for example. The negative terminal 26a may be formed integral with the negative current collector 26, or may alternatively be connected to an end portion of the negative current collector 26.

As in the case of the positive current collector 22, the negative current collector 26 is preferably made of a material with excellent chemical stability and electrical conductivity. Examples of such materials are aluminum, nickel, stainless steel, copper, platinum, gold, silver, and like metal materials, ITO, etc. The negative current collector 26 may be made of any material as long as it has electron conductivity and does not react with the negative electrode active material layer 27, and examples thereof are not limited to the above-mentioned materials.

The negative electrode active material layer 27 is made of, as a main component, a negative electrode active material capable of occluding and releasing lithium. Examples of usable negative electrode active materials capable of occluding and releasing lithium include carbon materials capable of occluding and releasing lithium, composite materials of metal-based materials and carbon-based materials, and materials capable of alloying lithium. Specific examples of usable carbon materials capable of occluding and releasing lithium include graphite, non-graphitizable carbon, and graphitizable carbon. More specifically, pyrolytic carbons, cokes (pitch coke, needle coke, petroleum coke), graphites, glassy carbons, calcined organic polymer compounds (carbonized materials obtained by calcining phenol resin, furan resin, or the like at a suitable temperature), carbon fiber, activated carbon, and like carbon materials are usable.

In the case where a material with a layered structure, such as graphite, is used as the negative electrode active material, it is preferable that the negative electrode active material is oriented so that the layers forming the graphite or the like are perpendicular to the principal surfaces of the solid electrolyte layer 24. This is because lithium is occluded between layers of the graphite or the like at the time of charge of the thin-film layer 3, and thus the above orientation facilitates the movement of lithium, reducing the resistance of the negative electrode active material layer 27.

Examples of usable materials capable of alloying lithium include various kinds of metal elements and metalloid elements. These may be in the form of simple substances, alloys, or compounds, or may at least partially have one or more such phases. In this invention, alloys encompass, in addition to those formed of two or more kinds of metal elements, those containing one or more kinds of metal elements and one or more kinds of metalloid elements. Further, those containing a nonmetallic element are also acceptable. The structure thereof may be a solid solution, a eutectic crystal (eutectic mixture), an intermetallic compound, or two or more kinds thereof co-existing together.

Specific examples of such metal elements or metalloid elements include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt).

In particular, as such elements, those containing metal elements or metalloid elements of Group 14 of the long form of the periodic table as constituent elements are preferable. Those containing at least either silicon or tin as a constituent element are especially preferable. This is because silicon and tin have a high capability of occluding and releasing lithium, and thus high energy density can be obtained. Specific examples thereof include elemental silicon, alloys and compounds thereof, elemental tin, alloys and compounds thereof, and materials at least partially having one or more such phases.

In addition, alloys containing tin (Sn), cobalt (Co), and carbon (C) are also usable, for example. Further, it is also possible to use polyacethylene, polypyrrole, or a like polymer, $SnO_2$ or a like oxide, or the like as the material capable of occluding and releasing lithium. In the negative electrode active material layer 27, a single kind or a mixture of two or more kinds of the above-mentioned negative electrode materials capable of occluding and releasing lithium may be used as the negative electrode active material.

The solid electrolyte layer 24 is made of an inorganic solid electrolyte having lithium ion conductivity as a main component, for example. Examples of inorganic solid electrolytes having lithium ion conductivity include lithium nitrides, halides, oxides, and phosphorus sulfide compounds. More specifically, $Li_3N$, $LiI$, $Li_3N$—$LiI$—$LiOH$, $LiSiO_4$, $LiSiO_4$—$LiI$—$LiOH$, $Li_3PO_4$—$Li_4SiO_4$, $Li_2SiS_3$, $La_{2/3-x}Li_{3x}TiO_3$, $LiSr_2TiTaO_6$, and the like can be mentioned. Because an electrolytic solution or like flammable organic solvent is not used therein, the solid electrolyte layer 24 using such an inorganic solid electrolyte has no problem of liquid leakage, etc., and is highly safe.

As the inorganic solid electrolyte having lithium ion conductivity, lithium titanium phosphate ($LiTi_2(PO_4)_3$) containing lithium and titanium can also be used, for example. Lithium titanium phosphate has the NASICON-type structure, and high ion conductivity can be obtained.

The thin-film battery 3 is charged when a direct voltage is supplied thereto from the voltage converter 16 or the external connection terminal 7. At the time of charge, for example, lithium ions are released from the positive electrode active material layer 23 and, through the solid electrolyte layer 24, occluded in the negative electrode active material layer 27. The thin-film battery 3 can be charged with electric power obtained using an electromagnetic induction technique, and can thus be charged simultaneously with the use of the IC card 1. Therefore, the time and effort for cumbersome charging can be saved.

At the time of discharging the thin-layer battery 3, for example, lithium ions are released from the negative electrode active material layer 27 and, through the solid electrolyte layer 24, occluded in the positive electrode active material layer 23. As the thin-film battery 3 is thus discharged, the CPU 14, the display portion 6, and the like are driven through the interface 11.

Figure 4:
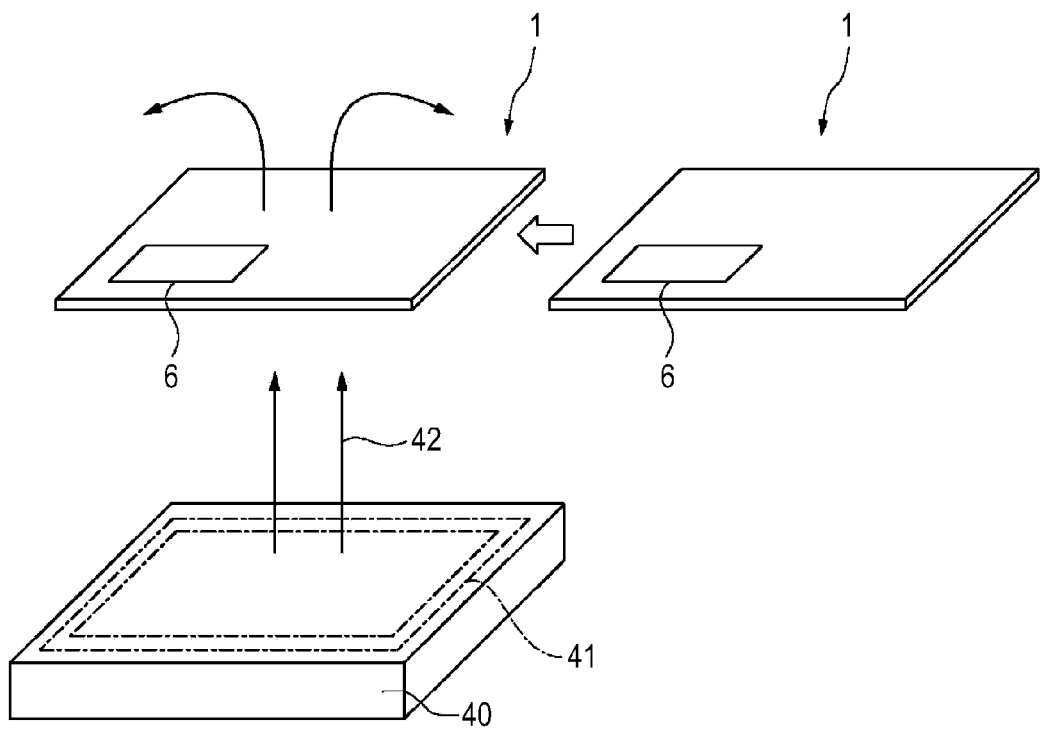
FIG. 4 is a schematic diagram for explaining an example of the operation of the IC card according to the first embodiment of the invention.

FIG. 4 illustrates an example of the operation of the IC card 1 having the above configuration.

First, the IC card 1 is placed in an alternating current magnetic field 42 produced from an antenna coil 41 of a reader/writer 40, whereby an alternating voltage is induced by the antenna coil 5 of the IC card 1. The alternating voltage is converted into a direct voltage by the voltage converter 16 of the IC card 1, and charges the thin-film battery 3 based on the control from the CPU 14. The direct voltage converted by the voltage converter 16 may also be supplied to the CPU 14 to drive the CPU 14.

According to the first embodiment, the IC card 1 is brought close to a reader/writer so that the alternating current magnetic field of the reader/writer induces an alternating voltage in the antenna coil 5 of the IC card 1, and the alternating voltage is converted into a direct voltage by the voltage converter 16 and supplied to the thin-film battery 3. Therefore, the thin-film battery 3 can be easily charged simply by bringing the IC card 1 close to a reader/writer. Further, the user can press a button provided on the IC card 1 to drive the display portion 6 by electric power of the thin-film battery 3, so that information stored in the EEPROM 15 is displayed thereon. That is, it is possible for the user to check a variety of information whenever and wherever he/she wants.

In addition, because the thin, highly flexible thin-film battery 3 is formed as a secondary battery on the substrate 2, the thickness of the IC card 1 is not increased, and the flexibility thereof is not impaired. Further, because the thin-film battery 3 does not use a liquid-type electrolyte, no liquid leakage occurs in case of breakage.

(2) Second Embodiment

An IC card according to the second embodiment is different from the first embodiment in that the solid electrolyte layer 24 of its thin-film battery 3 is made of, as a main component, a lithium ion conductor having an average composition represented by the following formula (1) or (2):

$$Li_{1+x}M1_{2-x}(PO_4)_3 \quad (1)$$

wherein M1 represents at least one kind selected from the group consisting of aluminum (Al), scandium (Sc), indium (In), iron (Fe), chromium (Cr), gallium (Ga), yttrium (Y), and lanthanum (La), and x is within a range of $0 \le x \le 2.0$; or

$$Li_{1+2x}M2_xTi_{2-x}(PO_4)_3 \quad (2)$$

wherein M2 represents at least one kind selected from the group consisting of zinc (Zn), silicon (S), manganese (Mn), germanium (Ge), neodium (Nd), strontium (Sr), and vanadium (V) and has a valence of 2, and x is within a range of $0 \le x \le 2.0$.

Figure 5:
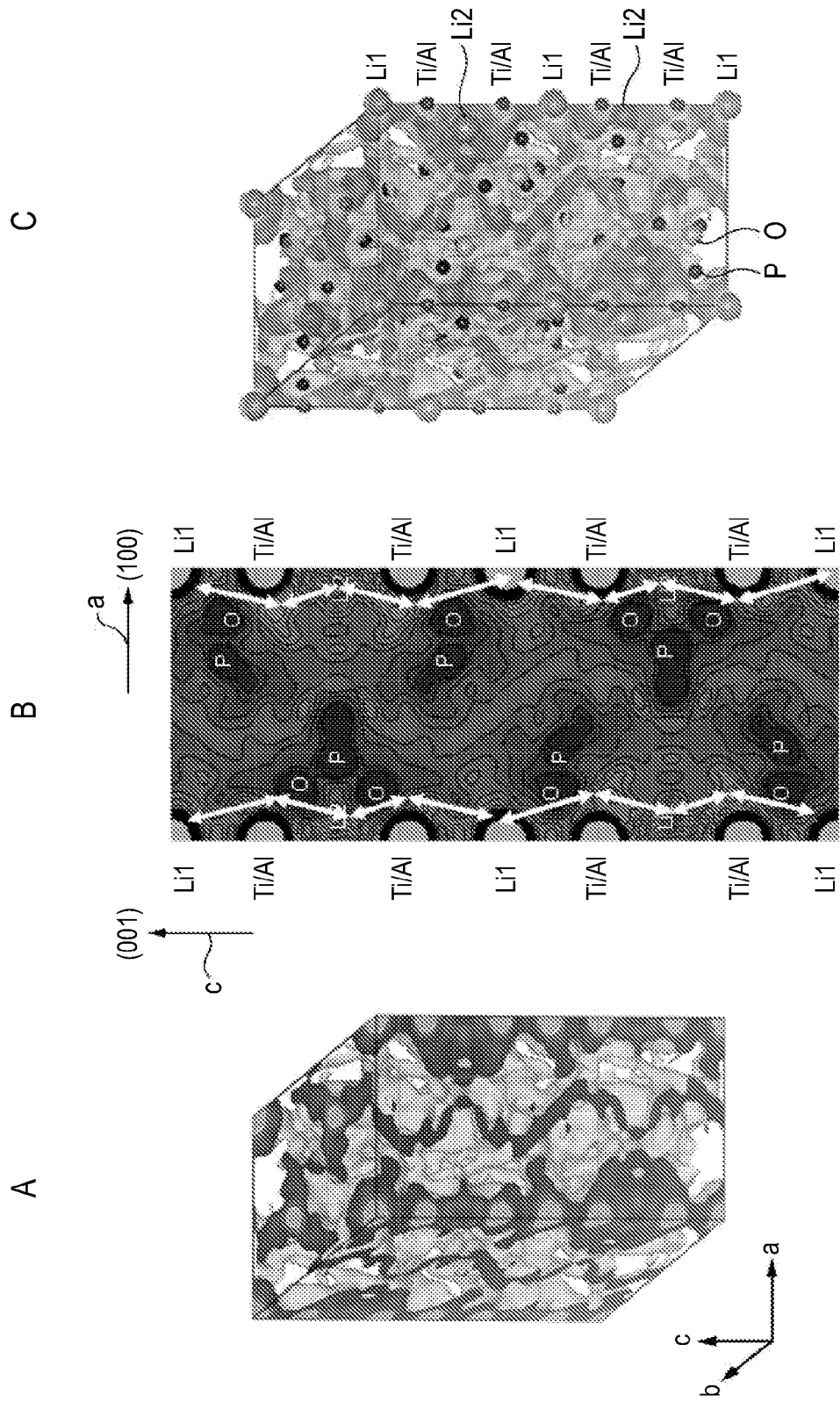
FIG. 5 shows the diffusion path of lithium ions in a lithium ion conductor.

First, with reference to FIG. 5, the diffusion path of lithium ions in the lithium ion conductor having an average composition represented by the formula (1) or (2) is explained. FIG. 5A shows nuclear density distribution visualized three-dimensionally. FIG. 5B shows the nuclear density distribution in the (010) plane visualized two-dimensionally. FIG. 5C shows the positions of atoms in the nuclear density distribution of FIG. 5A.

The arrow a in FIG. 5B represents the (100) direction, i.e., the direction of the crystallographic a-axis, while the arrow c represents the (001) direction, i.e., the direction of the c-axis. The white arrow in FIG. 5B represents the diffusion path of lithium ions. In FIG. 5B and FIG. 5C, "Li1" and "Li2" indicate the position of lithium, and "Ti/Al" indicates the position of titanium or aluminum. Further, "P" indicates the position of phosphorus, and "O" indicates the position of oxygen.

The nuclear density distribution shown in FIG. 5 can be determined as follows.

First, as a lithium ion conductor having an average composition represented by the formula (1), a polycrystal powder of $Li_{1+x}Al_xTi_{2-x}(PO_4)_3$ ($0 \le x \le 2$) obtained by partial substitution of titanium of lithium titanium phosphate ($LiTi_2(PO_4)_3$) with aluminum, for example, is used as a specimen, and the crystal structure is determined in a neutron diffraction experiment. Next, the data obtained from the neutron diffraction experiment are analyzed using the Rietveld analysis by refining the crystal structure parameters and the lattice constants. From the Rietveld analysis, further analysis is performed by the maximum entropy method based on the information theory, and the nuclear density distribution is thereby determined. The determined nuclear density distribution is visualized three-dimensionally to observe the movement of lithium ions.

FIG. 5 shows that in the lithium ion conductor having an average composition represented by the formula (1), the direction of lithium ion flow is fixed, i.e., such a lithium ion conductor is anisotropic. Specifically, it is shown that in $Li_{1+x}Al_xTi_{2-x}(PO_4)_3$, lithium ions flow along the direction of a crystallographic axis, especially along the c-axis direction. Although FIG. 5 shows the case where titanium is partially substituted with aluminum, also in the case where titanium is partially substituted with another metal represented by M1 in the formula 1 or M2 in the formula 2, a similar lithium ion pathway is resulted.

It is also shown that in the case where the value of x in $Li_{1+x}Al_xTi_{2-x}(PO_4)_3$ is more than 0, the thus-increased lithium exists in the lithium ion diffusion path in the c-axis direction. The increased lithium allows improvement of the lithium ion conductivity.

The following specifically describes how to most efficiently use the lithium ion conductor with such a diffusion path as a solid electrolyte material.

Figure 6:
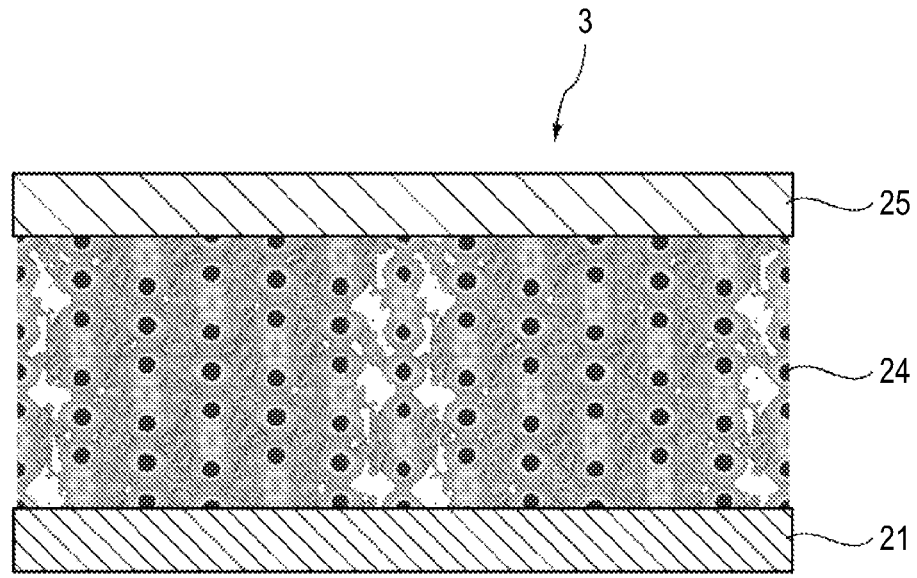
FIG. 6 is an enlarged cross-sectional view of a thin-film battery according to a second embodiment of the invention.

FIG. 6 is an example of the configuration of the thin-film battery 3. This thin-film battery 3 is different from that of the first embodiment in that the solid electrolyte layer 24 is made of, as a main component, a lithium ion conductor having an average composition represented by the following formula (1) or (2). The lithium ion conductor having an average composition represented by the formula (1) or (2) is preferably a single crystal or a polycrystal, and is particularly preferably a single crystal. Use of a single crystal or a polycrystal allows lithium ions to flow efficiently along the lithium ion diffusion path. A single crystal or a polycrystal can thus be efficiently used as the material of the solid electrolyte layer 24.

Lithium ions flow particularly along the direction of the crystallographic c-axis. Accordingly, it is preferable that the direction of the c-axis of the single crystal or the polycrystal in the solid electrolyte layer 24 is oriented perpendicularly to the principal surfaces of the positive electrode 21 and the negative electrode 25. This is because when the direction of the c-axis of the single crystal or the polycrystal in the solid electrolyte layer 24 is perpendicular to the principal surfaces of the positive electrode 21 and the negative electrode 25, this further increases the efficiency of the lithium ion flow.

The value of x in the formulae (1) and (2) is within a range of $0 \leq x \leq 2.0$. With an increase in the value of x within this range, the concentration of lithium increases, reducing the porosity of the lithium ion conductor. The increased lithium is in the lithium ion diffusion path and relays the movement of lithium ions. This facilitates the movement of lithium ions in the crystal, thereby increasing the ionic conductivity. Therefore, a larger x value is more favorable. Specifically, in order to improve the ionic conductivity and in terms of ease of production, x is preferably within a range of $0.1 \leq x \leq 0.5$.

In the formula (1), M1 is preferably aluminum. This is because aluminum has a smaller ionic radius compared with titanium, and the lithium ion path as indicated by the white arrow in FIG. 5B can thus be shorter, which leads to an improvement in the ionic conductivity.

Further, in the formulae (1) and (2), it is preferable that M1 and M2 are divalent elements or that M1 and M2 are monovalent elements. This is because when M1 and M2 are divalent elements or M1 and M2 are monovalent elements, the lithium concentration in the lithium ion conductor can be increased, improving the ionic conductivity.

The solid electrolyte layer 24 having a single crystal can be produced, for example, using a substrate formed of a single crystal, by a method in which a layer is deposited thereon by laser ablation, sputtering, or the like while optionally applying a temperature to the substrate, or in which a layer is stacked on the substrate by CVD or like vapor-phase synthesis. It is also possible to melt a polycrystalline specimen of the lithium ion conductor represented by the formula (1) or (2) using any of various known techniques to obtain a single-crystalline bulk material, and then cutting it out.

Except for the points mentioned above, the second embodiment is the same as the first embodiment.

According to the second embodiment, the solid electrolyte layer 24 is made of, as a main component, the lithium ion conductor having an average composition represented by the following formula (1) or (2). Therefore, the lithium ion conductivity in the solid electrolyte layer 24 can be improved over the first embodiment. In particular, by orienting the c-axis of the solid electrolyte layer 24 perpendicular to the positive electrode 21 and the negative electrode 25, the lithium ion diffusion path can be oriented in the direction from the positive electrode 21 to the negative electrode 25. In addition, because the thin-film battery 3 allows lithium ions to flow efficiently, a quick charge is possible. Further, because the solid electrolyte layer 24 has low resistance, there is a lower risk of heat generation.

(3) Third Embodiment

An IC card according to the third embodiment is different from the first embodiment in that it has a stack of thin-film batteries 3, and the thin-film batteries 3 are connected in parallel.

Figure 7:
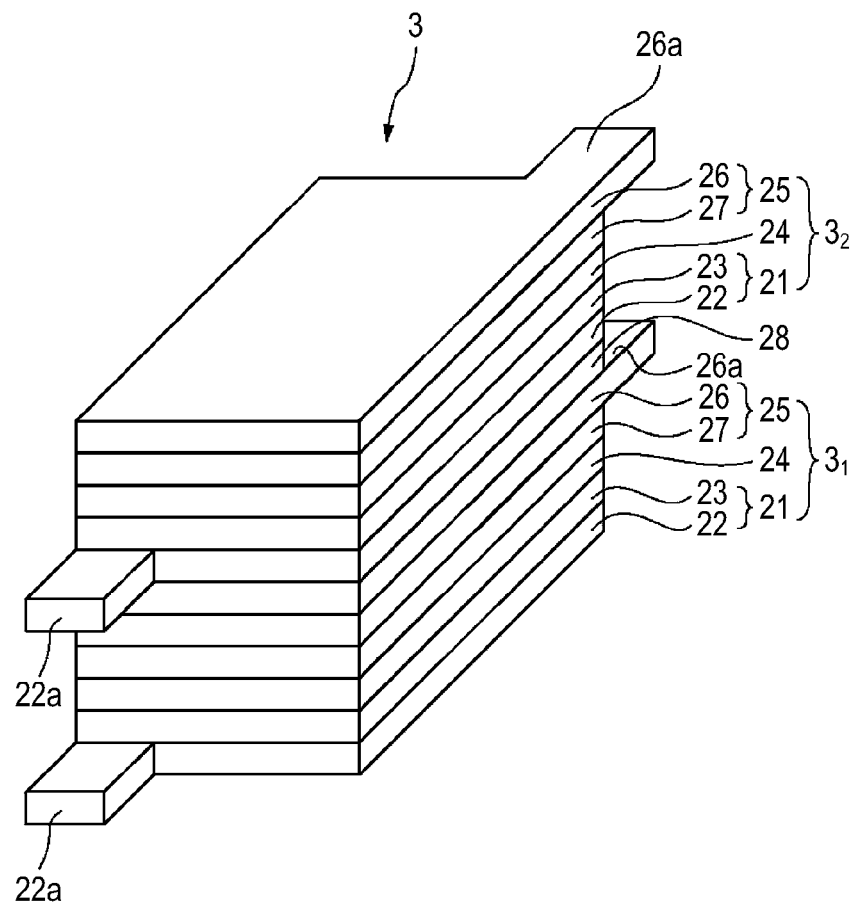
FIG. 7 is a perspective view showing an example of the configuration of a thin-film battery according to a third embodiment of the invention.

FIG. 7 shows an example of the configuration of the thin-film batteries 3 according to the third embodiment of the invention. As shown in FIG. 7, the thin-film batteries 3 are configured to include a first thin-film battery $3_1$ and the second thin-film battery $3_2$ that are stacked with an insulating layer 28 therebetween. The first thin-film battery $3_1$ and the second thin-film battery $3_2$ are connected in parallel. As the material of the insulating layer 28, a material made of an insulating material, such as $Si_3N_4$ or $SiO_2$, as a main component is usable, for example. However, the material is not limited thereto as long as intended functions as the insulating layer 28 can be obtained.

A CPU 14 controls the charging and discharging of the first thin-film battery $3_1$ and the second thin-film battery $3_2$. The CPU 14 may be configured, for example, to charge one of the first thin-film battery $3_1$ and the second thin-film battery $3_2$ and discharge the other battery.

Except for the points mentioned above, the third embodiment is the same as the first embodiment.

According to the third embodiment, a plurality of thin-film batteries 3 are stacked and these thin-film batteries 3 are connected in parallel. Therefore, a higher capacity can be obtained compared with the first embodiment.

(4) Fourth Embodiment

An IC card according to the fourth embodiment is different from the first embodiment in that it has a stack of a plurality of thin-film batteries 3, and the thin-film batteries 3 are connected in series.

Figure 8:
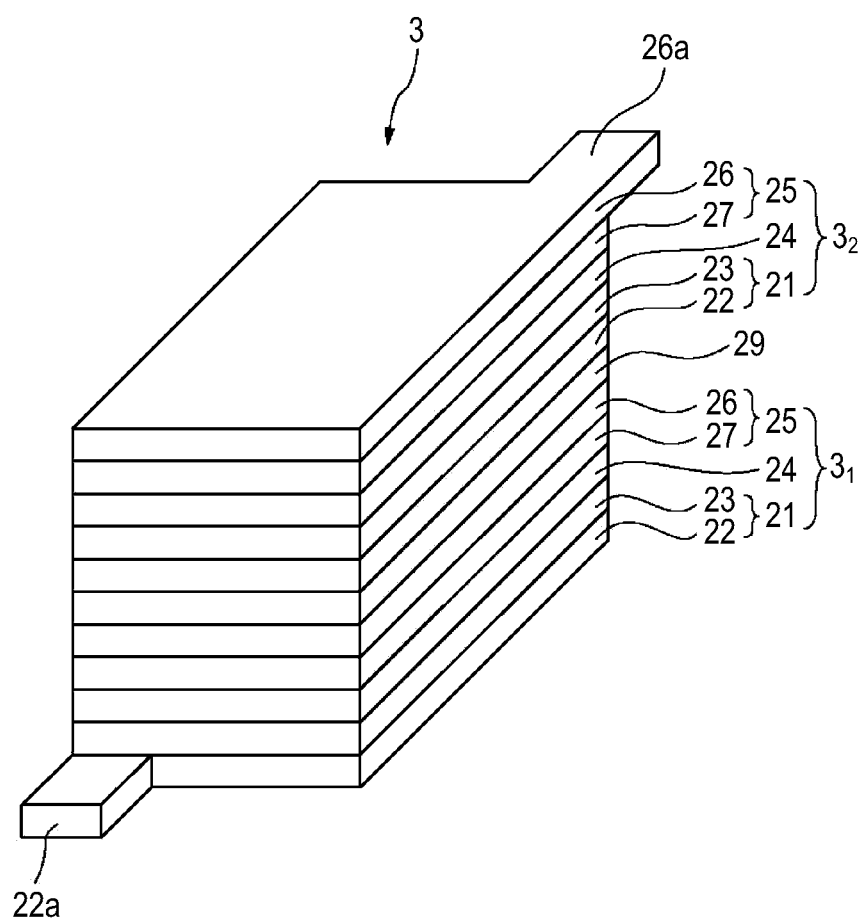
FIG. 8 is a perspective view showing an example of the configuration of a thin-film battery according to a fourth embodiment of the invention.

FIG. 8 shows an example of the configuration of the thin-film batteries 3 according to the fourth embodiment of the invention. As shown in FIG. 8, the thin-film batteries 3 are configured to include a first thin-film battery $3_1$ and the second thin-film battery $3_2$ that are stacked with an electrically conductive layer 29 therebetween. The first thin-film battery $3_1$ and the second thin-film battery $3_2$ are connected in series by the electrically conductive layer 29. As the material of the electrically conductive layer 29, a material made of a metal material, such as aluminum, nickel, copper, platinum, gold, or silver, as a main component is usable, for example. However, the material is not limited thereto as long as intended functions as the electrically conductive layer 29 can be obtained.

Except for the points mentioned above, the fourth embodiment is the same as the first embodiment.

According to the fourth embodiment, a plurality of thin-film batteries 3 are stacked and these thin-film batteries 3 are connected in series. Therefore, a higher voltage can be obtained compared with the first embodiment.

(5) Fifth Embodiment

Figure 9:
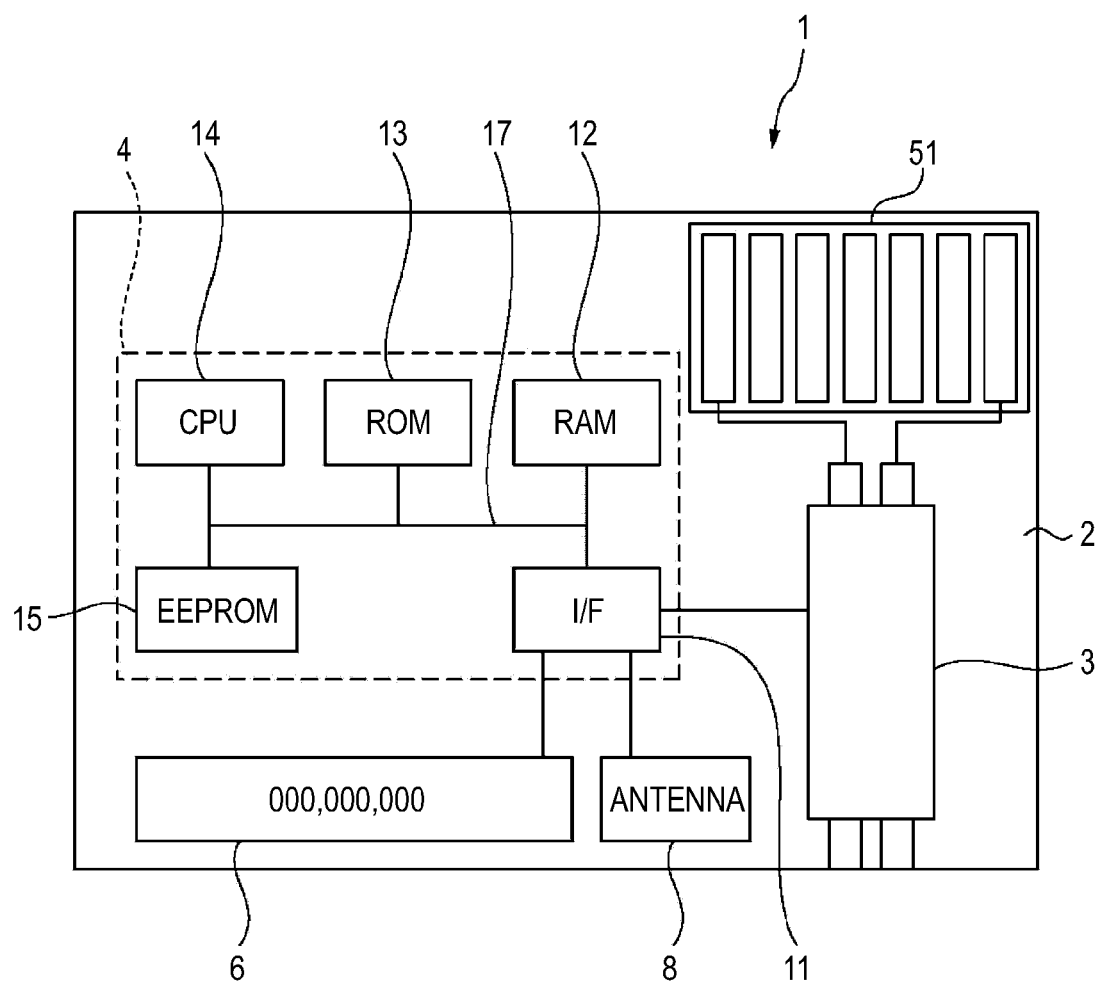
FIG. 9 is a block diagram showing an example of the configuration of an IC card according to a fifth embodiment of the invention.

FIG. 9 is a block diagram showing an example of the configuration of an IC card according to the fifth embodiment of the invention. The IC card according to the fifth embodiment is different from the first embodiment in that it further includes a solar cell 51.

The solar cell 51 is connected to a thin-film battery 3. Based on the control from a CPU 14, the solar cell 51 charges the thin-film battery 3. The solar cell 51 may be, for example, a thin-film silicon solar cell, a CIGS-based thin-film solar cell, a dye-sensitized solar cell, or an organic thin-film solar cell.

The IC card includes an antenna 8, and the antenna 8 is connected to the interface 11. The antenna 8 may be an antenna coil similar to that of the first embodiment, for example. Alternatively, a microstrip antenna or the like may also be used as the antenna 8.

Except for the points mentioned above, the fifth embodiment is the same as the first embodiment.

(6) Sixth Embodiment

Figure 10:
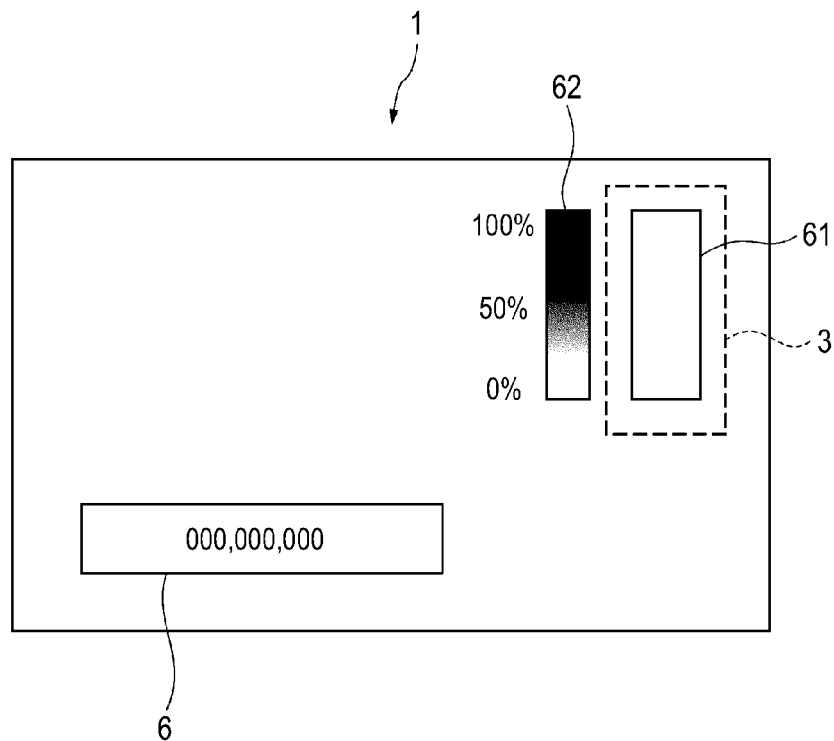
FIG. 10 is a plan view showing an example of the appearance of an IC card 1 according to a sixth embodiment of the invention.

FIG. 10 is a plan view showing the appearance of an IC card 1 of the sixth embodiment of the invention. As shown in FIG. 10, this IC card 1 is different from the first embodiment in that it includes a thin-film battery 3 that changes color depending on its state of charge and also a remaining-level indicator portion 61 for visually checking the state of the color of the thin-film battery 3 from outside.

The IC card 1 preferably has a scale 62 in the vicinity of the remaining-level indicator portion 61 for checking the remaining capacity of the thin-film battery 3, as shown in FIG. 10. The scale 62 shows colors of the thin-film battery 3 in various states of charge. Specifically, the scale 62 shows a gradation of colors of the thin-film battery 3 in various states of charge. The color of one end of the gradation is the same as the color of the thin-film battery 3 in a fully charged state, while the color of the other end is the same as the color of the thin-film battery 3 at a final discharged voltage. The user can easily tell the remaining capacity of the thin-film battery 3 by comparing the color of the scale 62 with the color of the remaining-level indicator portion 61.

Figure 11:
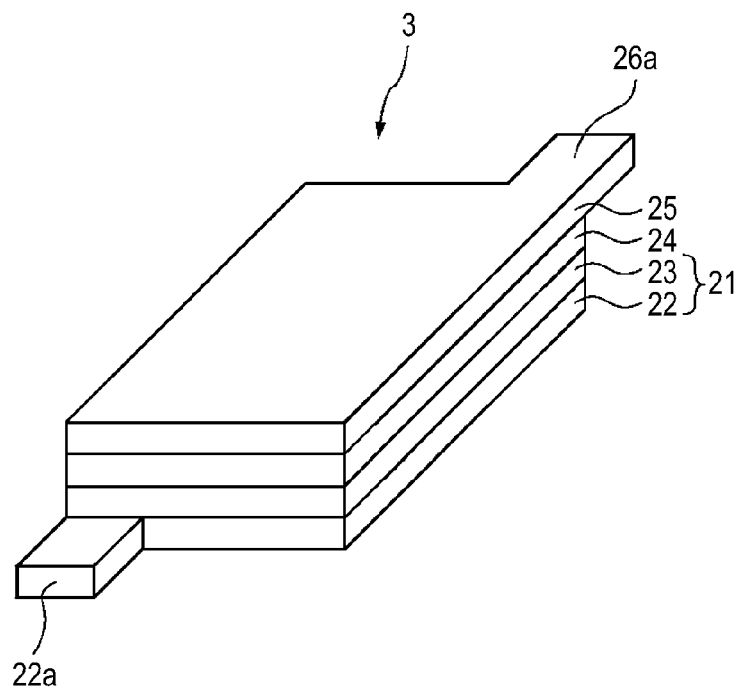
FIG. 11 is a perspective view showing an example of the configuration of a thin-film battery according to the sixth embodiment of the invention.

FIG. 11 is a cross-sectional view showing an example of the configuration of the thin-film battery 3. As shown in FIG. 11, the thin-film battery 3 is configured to include a positive current collector 22, a positive electrode active material layer 23, a solid electrolyte layer 24, and a negative electrode 25 stacked sequentially. The material of the positive current collector 22 may be a material made of a transparent electric conductor, such as ITO, as a main component, for example. The positive electrode material for the positive electrode active material layer 23 may be a material made of $LiMn_2O_4$ as a main component, for example. The material of the solid electrolyte layer 24 may be a material made of $Li_3PO_4$ as a main component, for example. The material of the negative electrode 25 may be a material made of a transparent electric conductor, such as ITO, as a main component, for example.

In the case where the thin-film battery 3 has such a configuration, the thin-film battery 3 changes color when lithium moves between the electrodes because of charging or discharging. For example, when lithium ions move to the negative electrode 25 from the positive electrode 21 because of charging, the thin-film battery 3 changes color to black. This is supposedly because lithium is intercalated into the negative electrode 25, a transparent electric conductor, or lithium and the negative electrode 25 undergo a decomposition reaction, thereby causing changes in the color of the thin-film battery 3.

According to the sixth embodiment, because the transparent electric conductor is used as the collector, the user can see the changes in the color of the thin-film battery 3 through the remaining-level indicator portion 61. Therefore, a change in the color of the thin-film battery 3 can be used as a battery level indicator. In addition, the user can tell the state of charge of the thin-film battery 3 at a glance.

Conventional batteries use a liquid-type electrolyte as the electrolyte. Accordingly, there is a need to pack the battery with a packaging member, and it thus is difficult to visually check the positive electrode 21, the negative electrode 25, the solid electrolyte layer 24, etc. That is, even when a transparent electric conductor is used as the collector, it is not possible to see the changes in the color of the battery, which accompany charging and discharging. In contrast, the thin-film battery 3 of the sixth embodiment uses a solid electrolyte as the electrolyte. Accordingly, there is no need to pack the battery with a packaging member, and it thus is possible to visually check the positive electrode 21, the negative electrode 25, the solid electrolyte layer 24, etc. That is, when a transparent electric conductor is used as the collector, it is possible to see the changes in the color of the battery, which accompany charging and discharging.

Further, in a conventional battery, showing an indicator of the battery level requires a unit for observing voltage. In contrast, in the thin-film battery 3 of the sixth embodiment, by checking changes in the color of the thin-film battery 3, it is possible to tell the state of charge. Therefore, a unit for observing voltage is not required.

The first to sixth embodiments of the invention have been specifically described above. However, the invention is not limited to the first to sixth embodiments, and various modifications can be made based on the technical spirit of the invention.

For example, the shapes and configurations mentioned in the first to sixth embodiments are mere examples, and different values may be used if necessary.

Further, the configurations of the first to sixth embodiments may each be combined with one another without departing from the gist of the invention.

Although the first to sixth embodiments have described applications of the invention to non-contact IC cards, the invention is also applicable to a contact IC card. The invention is also applicable to a hybrid card with functions both as a non-contact IC card and as a contact IC card.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An IC card comprising:
an antenna coil for inducing electric power by electromagnetic induction;
a thin-film battery for storing electric power induced by the antenna coil, wherein:
the thin-film battery includes a positive electrode, a negative electrode, and an electrolyte between the positive electrode and the negative electrode,
the positive electrode and the negative electrode each include a collector made of as a main component a transparent electric conductor, and
the transparent electric conductor is an oxide of indium and tin;
a flexible display portion for displaying information and powered by the electric power from the antenna coil in the thin-film battery;

a control portion for controlling the display of information and the storage of the electric power from the antenna coil in the thin-film battery; and a flexible remaining-level indicator portion for visually checking a change in a color of the transparent electric conductor.

2. An IC card according to claim 1, wherein
the electrolyte including a single crystal of a lithium ion conductor having an average composition represented by Formula (1):

$$Li_{1+x}M1_xTi_{2-x}(PO_4)_3 \quad (1)$$

wherein M1 represents at least one kind selected from the group consisting of aluminum (Al), scandium (Sc), indium (In), iron (Fe), chromium (Cr), gallium (Ga), yttrium (Y), and lanthanum (La), and x is within a range of $0 \leq x \leq 2.0$.

3. An IC card according to claim 2, wherein the single crystal is oriented so that a c-axis thereof is perpendicular to surfaces of the positive electrode and the negative electrode.

4. An IC card according to claim 1, wherein
the electrolyte including a lithium ion conductor having an average composition represented by Formula (2):

$$Li_{1+2x}M2_xTi_{2-x}(PO_4)_3 \quad (2)$$

wherein M2 represents at least one kind selected from the group consisting of zinc (Zn), silicon (S), manganese (Mn), germanium (Ge), neodium (Nd), strontium (Sr), and vanadium (V) and has a valence of 2, and x is within a range of $0 \leq x \leq 2.0$.

5. An IC card according to claim 1, further comprising:
a storage portion for storing the information displayed on the display portion.

6. An IC card according to claim 1, wherein the thin-film battery is an all-solid secondary battery.

7. An IC card according to claim 1, further comprising a solar cell, and wherein the control portion controls the charging of the thin-film battery from the solar cell.

8. An IC card according to claim 1, comprising a plurality of thin-film batteries for storing electric power induced by the antenna coil,
the plurality of thin-film batteries being stacked and connected in series and/or in parallel.

9. An IC card according to claim 1, further comprising
a connection terminal for connecting the thin-film battery to an external power supply, so that the control portion controls the charging of the thin-film battery from the external power supply.

10. An IC card comprising:
a solar cell;
a thin-film battery for storing electric power generated by the solar cell, wherein:
   the thin-film battery includes a positive electrode, a negative electrode, and an electrolyte between the positive electrode and the negative electrode,
   the positive electrode and the negative electrode each include a collector made of as a main component a transparent electric conductor, and
   the transparent electric conductor is an oxide of indium and tin;
a flexible display portion for displaying information and powered by the electric power from the solar cell in the thin-film battery;
a control portion for controlling display of the information and the storage of the electric power from the solar cell in the thin-film battery; and
a flexible remaining-level indicator portion for visually checking a change in a color of the transparent electric conductor.

11. An IC card according to claim 1, further comprising:
a button configured to drive the display portion by the electric power from the antenna coil in the thin-film battery.

12. An IC card according to claim 1, wherein the control portion is configured to operate a controlling program for charging and discharging of the thin-film battery.

* * * * *